Aug. 12, 1924.

E. PASCUCCI

OPTICAL SYSTEM

Filed July 19, 1921      3 Sheets-Sheet

Emilio Pascucci
INVENTOR

BY
ATTORNEY

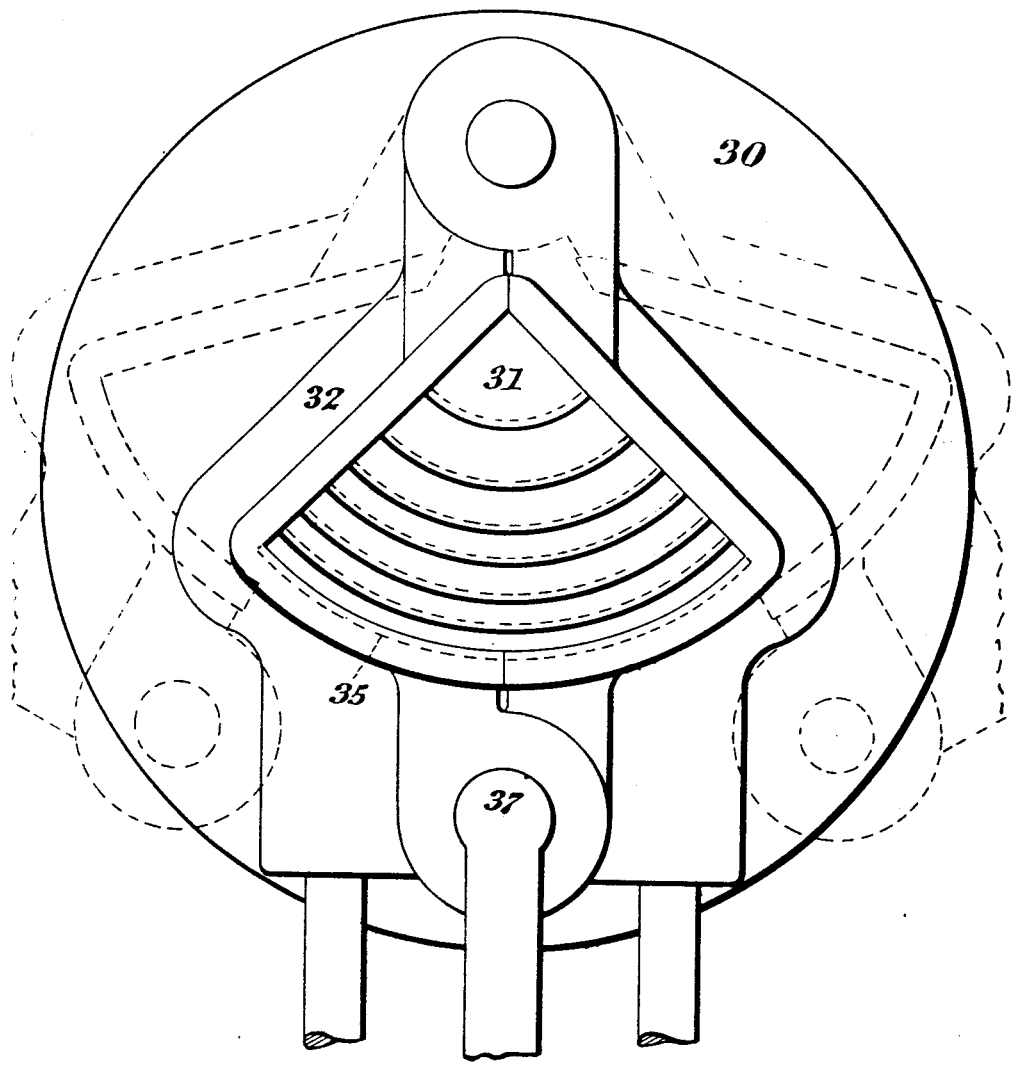

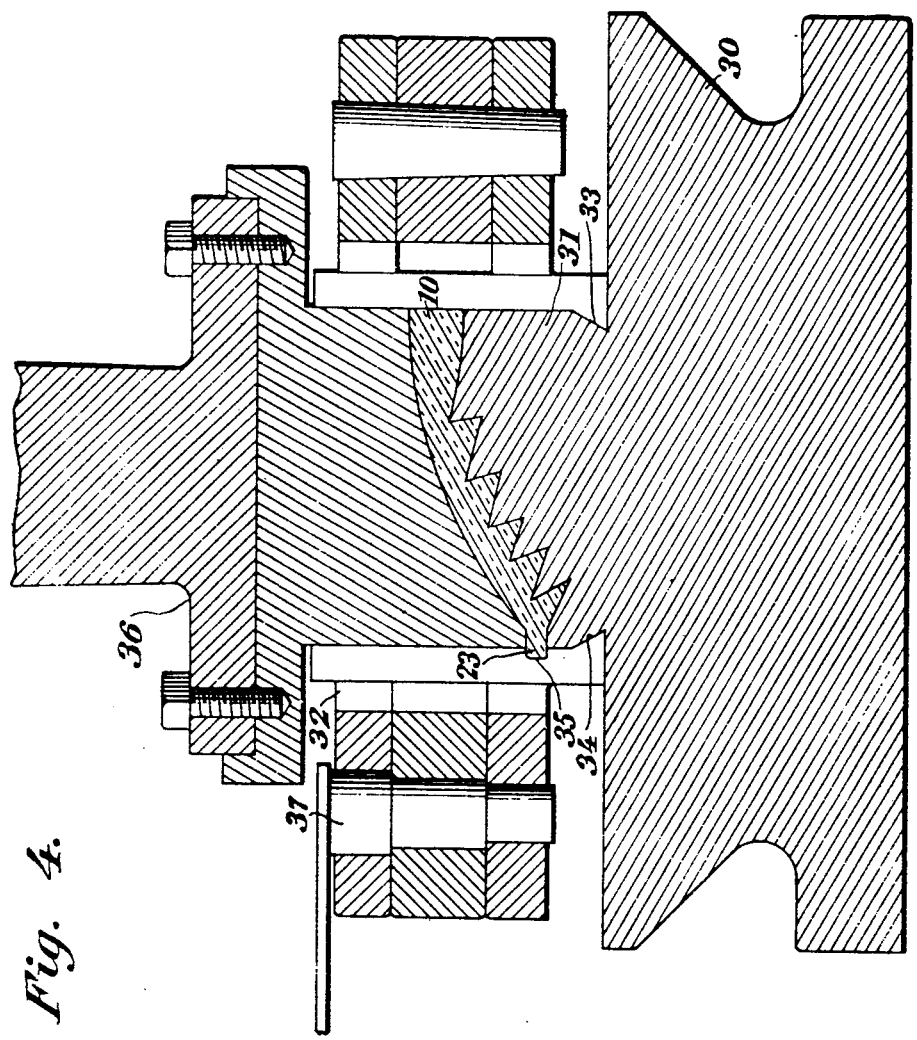

Patented Aug. 12, 1924.

1,504,970

UNITED STATES PATENT OFFICE.

EMILIO PASCUCCI, OF CORNING, NEW YORK, ASSIGNOR TO CORNING GLASS WORKS, OF CORNING, NEW YORK, A CORPORATION OF NEW YORK.

OPTICAL SYSTEM.

Application filed July 19, 1921. Serial No. 485,841.

*To all whom it may concern:*

Be it known that I, EMILIO PASCUCCI, a citizen of the United States of America, and a resident of Corning, New York, have invented certain new and useful Improvements in Optical Systems, of which the following is a specification.

Certain disadvantages are present in the lenses now in common use with a smooth outer convex face and a corrugated or stepped inner face. Among these disadvantages are the loss of light falling on the miters and projected thereby out of the edges thereof as to render them inefficient in the purpose for which such lenses are used.

My invention has for its object to avoid these and other defects of the previous construction and for this purpose I employ a corrugated lens formed from pressed glass and having its corrugated inner face provided with miters or steps whose lower faces are on the same angle as the path of the internal rays, i. e., a corrugated lens having miters that are undercut.

It is obvious that it would be exceedingly difficult to produce a lens having undercut miters in the usual manner, as by pressing the entire lens in one piece. Therefore, I have, as an embodiment of this invention, shown means whereby such lens can be produced by pressing segments specifically, in the form of quadrants, but the lens can be made of sectors of any arc equally as well.

The invention will be claimed at the end hereof, but will be first described in connection with the accompanying drawings, in which:—

Fig. 3, is a plan of a mold used in pressing a quadrant of the lens, the parts of the mold being shown assembled by full lines, and the mold ring being shown separated by dotted lines, to permit the sector of the lens to be removed from the mold; and Fig. 4, is a vertical longitudinal section through the mold, all of the parts being shown in the position assumed when the mold-plunger has completed its downward stroke.

Figure 1:
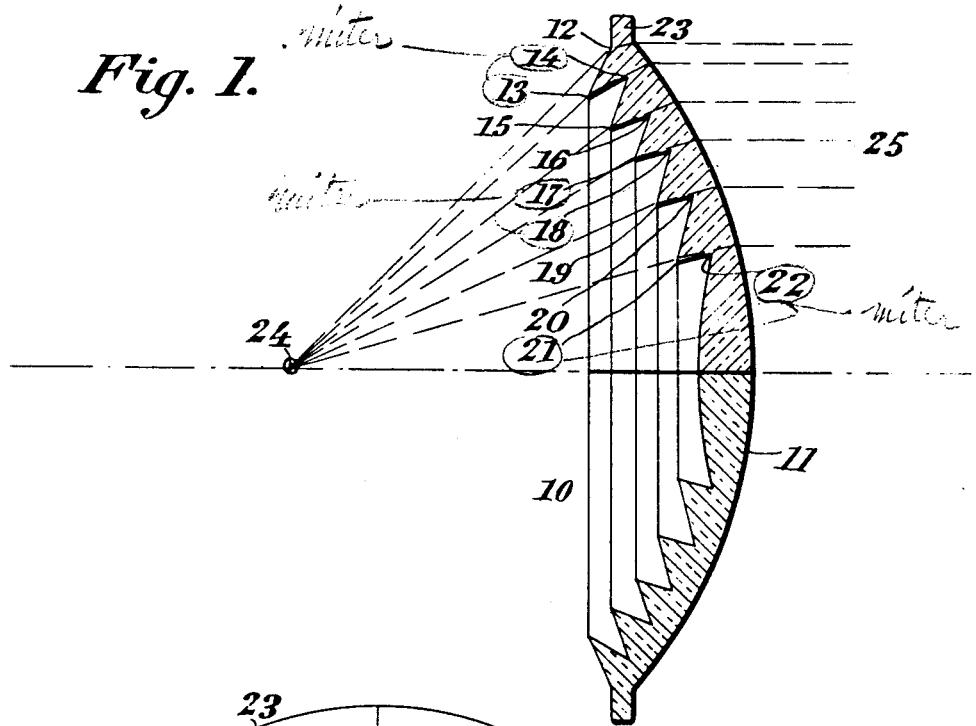
Figure 1, is a vertical section through a corrugated lens having undercut miters, illustrating diagrammatically the path of light rays passing therethrough from a light source.

Referring to the drawings, the lens 10 (Figs. 1 and 2) has a convexed front face 11, and a rear face composed of a series of zones 12—13, 14—15, 16—17, 18—19, 20—21 which are united by miters or steps 13—14, 15—16, 17—18, 19—20, 21—22, and is surrounded by a flange 23 by means of which the lens can be secured in a lamp frame (not shown).

The miters 13—14, 15—16, etc., of the lens are formed, as shown, each of the miters being inclined at an angle with respect to the axis of the lens whereby they will each be undercut, and their diameters at the points 14, 16, 18, and 20, will be greater than their diameters at the points 13, 15, 17 and 19 respectively.

With such lens when properly placed in front of a source of illumination 24, no dark bands coinciding with the positions of the miters will be produced, as is the case with the usual type of corrugated lens. This is due to the fact that the miters are located substantially in the path in which the rays from the source pass through the lens at the several miters and hence practically none of the rays falling thereon are lost. This is illustrated by following the course of any ray. For instance, the ray 24—25 falls upon the rear face of the lens at a proper point to be refracted therethrough on a line parallel to the miter 17—18.

Figure 2:
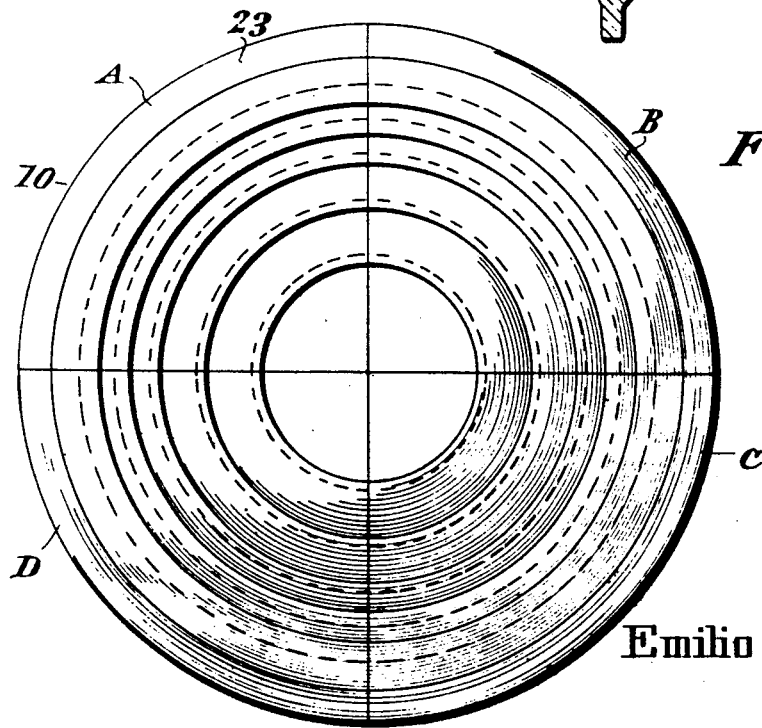
Fig. 2, is a view of the inner face of the lens shown by Fig. 1.

It is obvious that a lens constructed as above described can not be made in the usual manner, and, therefore, I have shown the lens 10 composed of similarly formed segments A, B, C, and D (see Fig. 2). The segments can be in the form of the quadrants illustrated, or they can be of any other size. These segments can be made with the use of a glass press mold, such as that shown by Figs. 3 and 4 of the drawings.

The mold comprises a base 30 having a raised portion 31 whose upper surface corresponds to the inner face of one segment of the lens. Adapted to surround the raised portion 31 of the base 30 and engage therewith, is a mold-ring 32 composed of similarly formed halves that are hinged together preferably at the apex of the segment.

The mold ring is provided with an angular flange 33 along its base that is designed to engage with a similarly formed groove 34 in the base 30. The mold-ring 32 is provided with a groove 35 in which the flange 23 of the lens 10 is formed as shown by Fig. 4 of the drawings.

The mold-ring 32 is of sufficient height to form a guide way for a plunger 36 which is adapted to be operated in any approved manner. The contour of the lower face of the plunger 36 is such that the convexed front face of the segment of the lens will be formed.

In the operation of forming the segments of the lens, the mold is first assembled with the mold-ring 32 engaging with the raised portion 31 of the base 30, the ring being retained in closed position by means of a locking pin 37. A suitable quantity of molten glass is then deposited in the mold, and the plunger caused to descend and distribute the glass throughout the mold cavity. When the glass has set, the plunger is withdrawn from the mold, and the halves of the mold-ring separated as shown by the dotted lines Fig. 3. The segment is then removed from the mold by means of tongs, or any other suitable implements, which are used to grasp the flange 23 of the segment. Due to the construction of the miters it is desirable that the segment be withdrawn from raised portion of the mold base in a substantially horizontal plane. It is only necessary to open the halves of the mold-ring sufficiently to permit the withdrawal of the segment, after which the mold-ring can be closed and the operation repeated.

It is to be understood that while I have in the present instance shown a type of lens similar to those used in semaphores in connection with railway signalling, my invention can be used in connection with all other types of corrugated lenses, such for instance as the corrugated lenses having negative spherical aberration that are used for condensers in optical projection apparatus.

Having thus described my invention, what I claim and desire to secure by Letters Patent is:—

1. A Fresnel lens having on one face concentric zones united by miters, the miters being undercut, whereby they will be parallel to the path of the rays passing through the lens.

2. A Fresnel lens having a stepped face consisting of concentric zones united by miters the miters being undercut whereby they will be parallel to the paths of the rays passing through the lens, said lens being formed from segments.

3. A corrugated lens having concentric miters undercut whereby such miters will be substantially parallel to the rays passing through the lens, said lens being composed of pressed segments.

4. The combination with a light source, of a Fresnel lens receiving divergent rays from the source, having on the face receiving such rays concentric zones united by miters, the miters being undercut, whereby they will be parallel to the path of the rays passing through the lens.

In testimony whereof, I hereunto sign my name at Corning, New York, U. S. A., this 9th day of July, 1921.

EMILIO PASCUCCI.